US008475059B2

(12) United States Patent
Khamsepoor et al.

(10) Patent No.: US 8,475,059 B2
(45) Date of Patent: *Jul. 2, 2013

(54) IMAGE CAPTURING DEVICE WITH LENS COVER AND FOLDING SUPPORT

(75) Inventors: Ladan Khamsepoor, Santa Clara, CA (US); Kenneth Ling, San Francisco, CA (US); Allan Freas Velzy, Burlingame, CA (US); Kun-Jui Liu, Zhunan Township (TW); John Kiechel, Oakland, CA (US)

(73) Assignee: Logitech Europe S.A., Morges (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/796,581

(22) Filed: Jun. 8, 2010

(65) Prior Publication Data

US 2011/0243548 A1 Oct. 6, 2011

Related U.S. Application Data

(63) Continuation-in-part of application No. 12/790,650, filed on May 28, 2010, which is a continuation-in-part of application No. 29/349,423, filed on Mar. 31, 2010.

(51) Int. Cl.
*G03B 17/00* (2006.01)
*H04N 5/225* (2006.01)

(52) U.S. Cl.
USPC ........... 396/428; 396/421; 396/424; 396/448; 348/373

(58) Field of Classification Search
USPC ....... 396/428, 419, 421, 424, 448; 348/207.1, 348/373, 376
See application file for complete search history.

(56) References Cited

U.S. PATENT DOCUMENTS

| 6,396,924 | B1 * | 5/2002 | Suso et al. ............... 379/433.13 |
| 7,093,811 | B2 | 8/2006 | Wu |
| D533,887 | S | 12/2006 | Logan et al. |
| D554,682 | S | 11/2007 | Martinez et al. |
| D563,446 | S | 3/2008 | Stephens et al. |
| D564,559 | S | 3/2008 | Stephens et al. |
| D566,148 | S | 4/2008 | Akita |
| D579,967 | S | 11/2008 | Jones et al. |

(Continued)

OTHER PUBLICATIONS

U.S. Appl. No. 29/349,423, filed Mar. 31, 2010, Khamsepoor et al.

(Continued)

*Primary Examiner* — Rochelle-Ann J Blackman
(74) *Attorney, Agent, or Firm* — Kilpatrick Townsend & Stockton LLP

(57) ABSTRACT

An image capturing device includes a camera housing configured to house a set of electronic modules for generating a video stream from captured light. The camera housing includes a camera opening configured to let light enter the camera housing to be captured by the set of electronic modules. The webcam further includes a camera-housing base rotationally coupled to the camera housing, and includes a mounting base rotationally coupled to the camera-housing base. The camera housing is configured to rotate with respect to the camera-housing base to face the camera opening toward the mounting base or face the camera housing opening away from the mounting base. The webcam further includes a first hinge rotationally coupling the mounting base to the camera-housing base. With the camera opening facing toward the mounting base, the first hinge is configured such that the mounting base is foldable onto the camera opening to cover the camera opening.

18 Claims, 6 Drawing Sheets

U.S. PATENT DOCUMENTS

| | | |
|---|---|---|
| D595,328 S | 6/2009 | Kim et al. |
| D600,730 S | 9/2009 | Su |
| D614,223 S | 4/2010 | Kim et al. |
| 7,736,071 B2 | 6/2010 | Wahl et al. |
| D624,108 S | 9/2010 | Wang et al. |
| D624,109 S | 9/2010 | Wang et al. |
| D627,813 S | 11/2010 | Chen et al. |
| D629,031 S | 12/2010 | Su et al. |
| D631,079 S | 1/2011 | Tzeng |
| 8,157,457 B2 * | 4/2012 | Khamsepoor et al. ........ 396/428 |

OTHER PUBLICATIONS

"LifeCam XV-5500 Fact Sheet" Microsoft Corporation, Sep. 2008.

Office Action mailed on Dec. 22, 2011 in related U.S. Appl. No. 29/349,423.

\* cited by examiner

IMAGE CAPTURING DEVICE WITH LENS COVER AND FOLDING SUPPORT

CROSS REFERENCE TO RELATED APPLICATIONS

This application claims priority to, and is a continuation-in-part of, U.S. Design patent application No. 29/349423, filed Mar. 31, 2010, titled "Webcam with Foldable Case and Lens Cover" of Kenneth Ling et al., and claims priority to, and is a continuation-in-part of, U.S. patent application Ser. No. 12/790,650, filed May 28, 2010, titled "Image Capturing Device with Lens Cover and Folding Support" of Ladan Khamsepoor et al., which are both incorporated by reference herein in their entireties for all purposes.

BACKGROUND OF THE INVENTION

The present invention generally relates to peripheral devices for computers. More particularly, embodiments of the present invention relate to an image capturing device.

An example of an image capturing device is a webcam. A webcam is a peripheral device configured to be used with a computer, set-top box, etc., to capture light from a scene and generate a still images and/or a video stream from the captured light. Webcams are also often configured to capture audio and generate an audio-visual (AV) stream from the captured video and audio. The still image, the video stream, and/or the AV stream are typically transferred from the webcam to a computer. The computer typically receives the still image, the video stream, and/or the AV stream from the webcam for transmission across a network for viewing on a remote computer. The computer might also store the still image, the video stream, and/or the AV stream for future access and viewing. The still image, the video stream, and/or the AV stream may be used for a video telephone call or a video conference on the Internet.

Various webcams have been designed to meet a variety of purposes, such as the webcams described in U.S. Design Pat. Nos. D/285,578, D/270,612, D/270,588, and D/239,674, each of which is assigned to the assignee of the instant application. U.S. Design Pat. No. D/595,328 assigned to Microsoft Corp. shows a webcam having a base for desktop use but not for placement on a computer monitor. While a variety of webcams are currently on the market, businesses continue to strive to provide users with new webcams that have new features, which improve the comfortable and efficient use of the webcams. In particular, there is need for an image capturing device which is easily portable in a compact form factor, while protecting its lens from damage. Further, there is need for an image capturing device which can be easily attached to a display, other surface, or placed on a work surface.

BRIEF SUMMARY OF THE INVENTION

The present invention generally relates to peripheral devices for computers. More particularly, embodiments of the present invention relate to an image capturing device.

According to one embodiment of the present invention, an image capturing device (such as a camera or a webcam) includes a camera housing configured to house a set of electronic modules for generating still images and/or a video stream from captured light. The camera housing includes a camera opening configured to let light enter the camera housing to be captured by the set of electronic modules. In one embodiment, the image capturing device further includes a camera-housing base rotationally coupled to the camera housing, and includes a mounting base rotationally coupled to the camera-housing base. The camera housing is configured, in one embodiment, to rotate (or pan) with respect to the camera-housing base to face the camera opening toward the mounting base or face the camera housing opening away from the mounting base. The image capturing device further includes a first hinge rotationally coupling the mounting base to the camera-housing base. The first hinge provides that the camera housing and camera-housing base may tilt (e.g., tilt up or tilt down) with respect to the mounting base. With the camera opening facing toward the mounting base, the first hinge is configured, in one embodiment, such that the mounting base is foldable onto the camera opening to cover the camera opening.

According to a specific embodiment of the image capturing device, the mounting base includes a top wall, a front wall, and a back wall, which are configured to couple the mounting base to computer monitor or sit on a work surface to hold the camera housing for collecting light from a scene. The mounting base includes a second hinge rotationally coupling the top wall and the back wall. The back wall is rotatable on the second hinge to align the back wall substantially parallel and flush with the top wall. The top wall includes a raised ring that corresponds to the location of the camera opening with the back wall substantially parallel and flush with the top wall to prevent dust from contacting the camera opening.

According to another specific embodiment of the image capturing device, the image capturing device further includes a friction hinge rotationally coupling the camera housing and the camera-housing base such that the friction hinge provides that the camera housing may pan with respect to the camera-housing base. The image capturing device includes a set of electronic modules, which may include a light meter and a light collection array, and the light collection array is configured to adjust a light capture setting based on a light collection signal generated by the light meter.

According to another specific embodiment of the image capturing device, the first hinge is a motorized hinge, and the image capturing device further includes a processor coupled to the motorized hinge and the processor is configured to control the motorized hinge. The image capturing device may also include a microphone coupled to the processor, wherein the microphone is configured to operate with the processor to determine a direction of sound on the camera housing, and wherein the processor is configured to control the motorized hinge to direct (e.g., tilt) the camera housing at the sound. The friction hinge described above may be a motorized friction hinge rotationally coupling the camera housing and the camera-housing base, and the processor may be configured to control the motorized friction hinge to direct (e.g., pan) the camera housing at the sound.

According to another specific embodiment, the image capturing device is transformable into a plurality of use configurations for a plurality of uses. The first and second hinges of the image capturing device provide that the base may be folded and unfolded with respect to the camera housing and provide that the back wall may be variously angled with respect to the top wall and front wall. With the back wall variously angled with respect to the top wall and front wall the base is configured to be coupled to a computer monitor, a television, etc. The angle between the back wall and the top wall is configured to be set to approximately zero for placement on a flat surface, such as a desktop, for use of the image capturing device thereon. The first and second hinges are configured for the back wall to be folded substantially parallel with the top wall and for the base (with the back wall and top wall substantially parallel) to be folded substantially parallel to the camera housing to provide a relatively compact configuration of the image capturing device for transport and for protection of the image collection array during transport.

These and other embodiments of the present invention are described in more detail in conjunction with the text below and the attached figures.

DETAILED DESCRIPTION OF THE INVENTION

The present invention generally provides a peripheral device for a computer. More particularly, embodiments of the present invention provide an image capturing device.

Image capturing devices, such as webcams, cameras, etc., are well known peripheral devices configured for capturing light from a scene and generating video and/or still images from the captured light. For convenience, image capturing devices are referred to herein as webcams. It will be understood that use of the term "webcam" in the detailed description does not limit the claims. The video generated by a webcam is typically transferred from a local computer, which is coupled to the webcam, to a remote computer for viewing on the remote computer. Webcams are often used for video telephony and video conferencing. Typically all of the parties in a video telephone call or a video conference have webcams configured for generating video from and scene for transfer to the other person or other people in the video telephone call or video conference. Webcams according to various embodiments of the present invention are also often configured to capture both audio and light from a scene for the generation of an audio-visual stream.

Figure 1A:
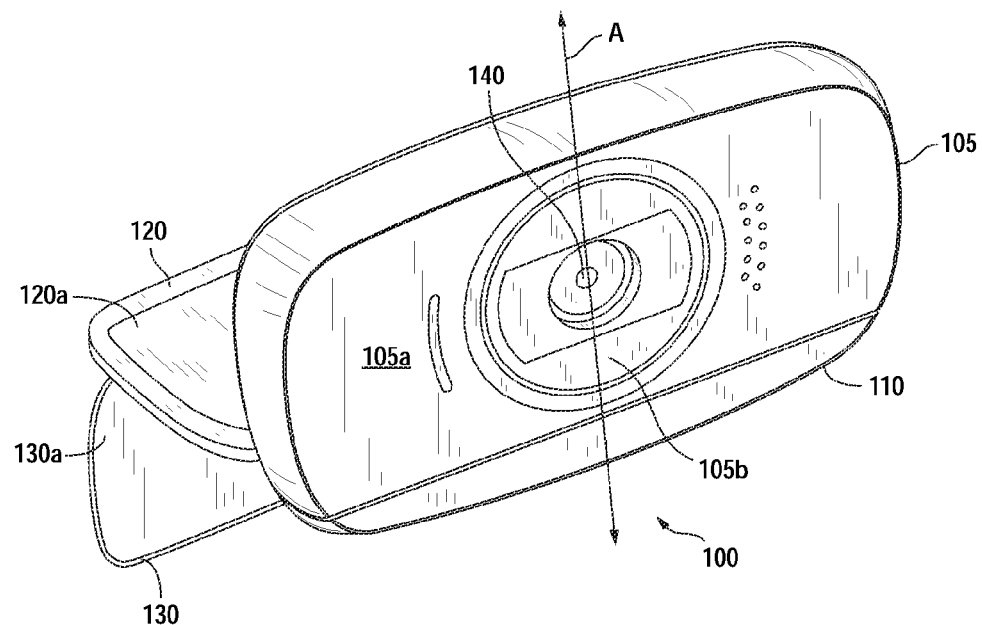
FIGS. 1A, 1B, and 1C are an overall perspective view, a front view, and a side view of a webcam according to one embodiment of the present invention.
Figure 1B:
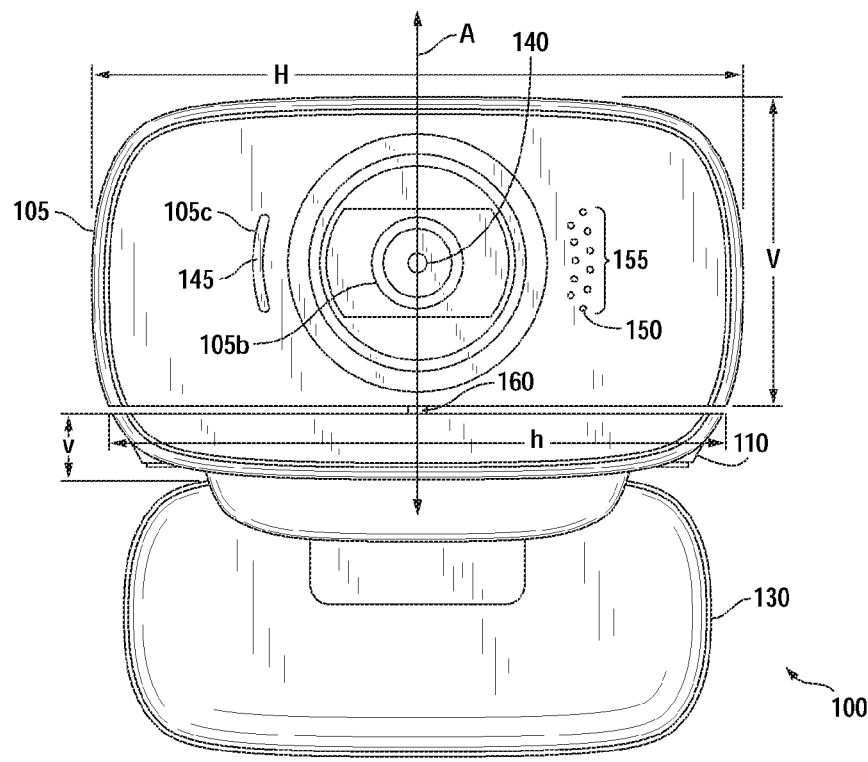
Figure 1C:
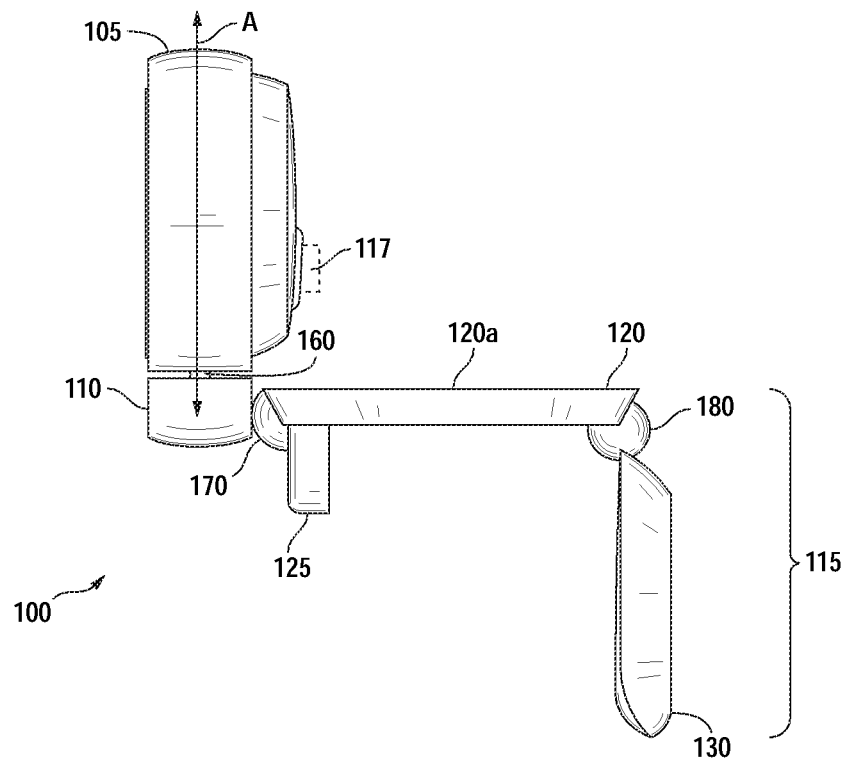

FIGS. 1A, 1B, and 1C are an overall perspective view, a front view, and a side view of a webcam 100 according to one embodiment of the present invention. Webcam 100 includes a camera housing 105, a camera-housing base 110, a mounting base 115, and an output cable 117. Output cable 117 is shown in phantom to indicate that images, video, and/or audio may be output from the webcam wirelessly in alternative embodiments. Mounting base 115 includes a top wall 120, a front wall 125, and a back wall 130. Webcam 100 includes a set of standard modules for collecting light and/or audio from a scene and converting the collected light and/or audio into still images or a video stream or an AV stream, which is transferred to a computer, a set-top-box or the like. A set as referred to herein includes one or more elements.

Figure 1D:
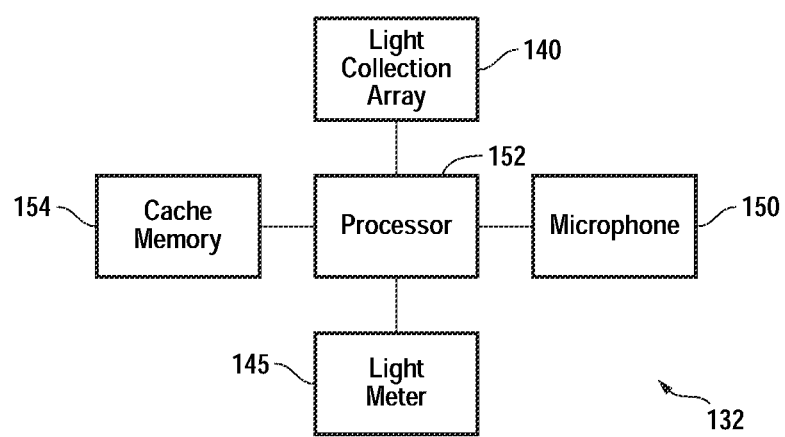
FIG. 1D is a simplified block diagram of a circuit that may be included in the webcam.

FIG. 1D is a simplified block diagram of a circuit 132, which may be included in webcam 100. Circuit 132 may include various standard modules, such as a light collection array 140 (e.g., a CCD array, a CMOS array, etc.), a light meter 145, a microphone 150, a processor 152, a cache memory 154, and the like. The various standard modules included in circuit 132 may be included in a set of standard modules, which may include various other standard modules that are not circuits, such as a set of lenses for focusing collected light onto the light collection array. Some of the standard modules mentioned herein may not be included in webcam 100, while other modules not mentioned herein might be included in the webcam. All of these electronic modules are well known in the art and are not described in detail herein. Camera housing 105 encloses these modules. The generated still images, video stream, and/or audio stream may be output from circuit 132 through output cable 117 or the like.

A front 105a of the camera housing includes various opening formed therein. For example, front 105a includes a camera opening 105b configured to allow light from a scene to pass to the light collection array. According to one embodiment, the camera housing includes a light meter opening 105c formed therein where light meter 145 collects light from a scene. The light collection array is configured to adjust a light collection setting based on an amount of light detected by the light meter from a scene. The light collection array 140 may adjust the light collection setting based on a signal received from the processor based on the processor receiving a light collection signal received from the light meter. The camera housing may also include a set of openings 155 configured to permit sound to enter the camera housing and be collected by the microphone.

According to one embodiment, camera housing 105 has a horizontal length "H" that is greater then a vertical length "V". The camera-housing base 110 similarly has a horizontal length "h" that is greater than a vertical length "v".

According to one embodiment, camera housing 105 is rotationally coupled to camera-housing base 110. Camera housing 105 may be configured to rotate about an axis "A" that passes vertically through an approximate center of the camera housing and the camera-housing base. Rotation about axis "A" is sometimes referred to as panning Camera housing 105 may be coupled to camera-housing base 110 via a variety of coupling devices.

Figure 2A:
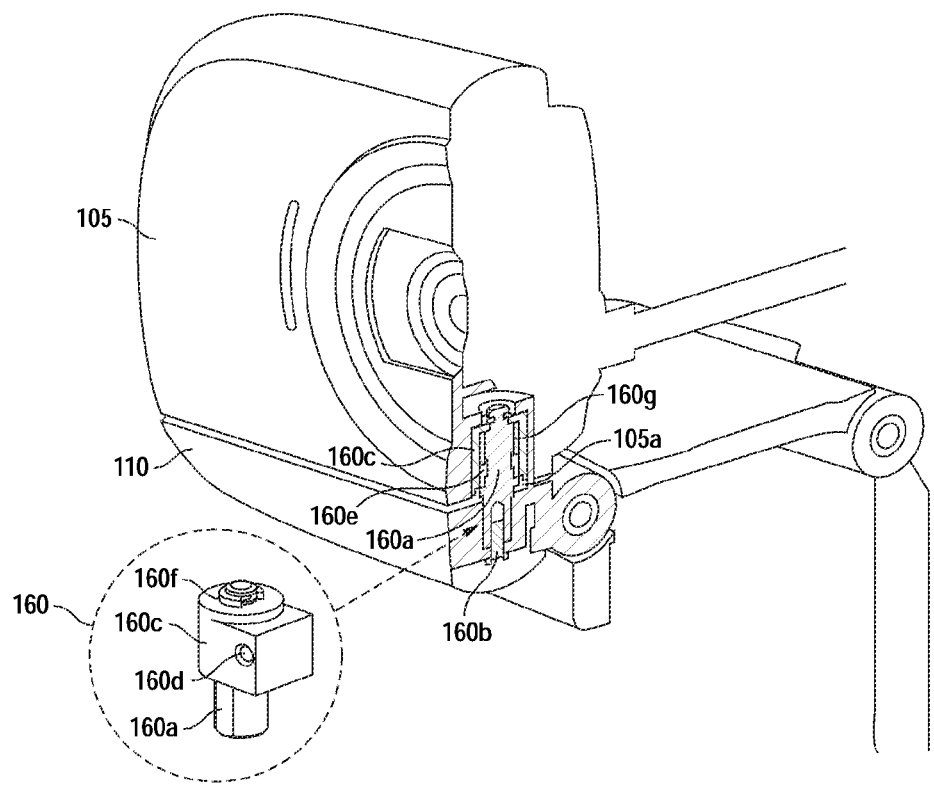
FIG. 2A is a cross-sectional view of the webcam and shows a coupling device, which is configured to rotationally couple the camera housing and the camera-housing base.

FIG. 2A is a cross-sectional view of webcam 100 and shows a coupling device 160, which is configured to rotationally couple camera housing 105 and camera-housing base 110. For convenience herein, coupling device 160 is referred to as a friction hinge. FIG. 2A shows friction hinge 160 in both a cross-sectional view and a non-cross-sectional view, which is separated from the cross-sectional view. Friction hinge 160 includes a shaft 160a, which is coupled to camera-housing base 110 via a fastener 160b. Fastener 160b may be a screw or the like. Friction hinge 160 further includes a housing 160c, which is coupled to camera housing 105. Housing 160c may have an asymmetric shape (e.g., a generally cylindrical shaped portion formed with a generally rectangular shaped portion) which is configured to fit into a complimentary shaped opening 105a formed in the camera housing. The asymmetric shape of housing 160c and the complimentary shaped opening 105a inhibit housing 160c from rotating while inserted in complimentary shaped opening 105a. Housing 160c may include an opening 160d formed therein to receive a fastener (not shown) to substantially secure housing 160c to camera housing 105. Housing 160c may be include another opening 160e formed therein to house a top portion of shaft 160a. Shaft 160a may be coupled to housing 160c by a spring fastener 160f, which may be an e-clamp. Friction hinge 160 may also include a friction cylinder 160g, which is positioned in opening 160e. Friction cylinder 160g has a central opening formed therein where the central opening is configured to receive shaft 160a. Shaft 160a is configured to rotate relative to friction cylinder 160g. According to one embodiment, friction cylinder 160g is also configured to rotated with respect to housing 160c. Shaft 160a and/or housing 160c may be in frictional contact friction cylinder 160g, such that camera housing 105 and camera-housing base 110 are configured to stay at a substantially fixed position (e.g., for typical use of the webcam) with respect to each other after these elements are manipulated by a user to put these elements in a configuration desired by the user.

Figure 2B:
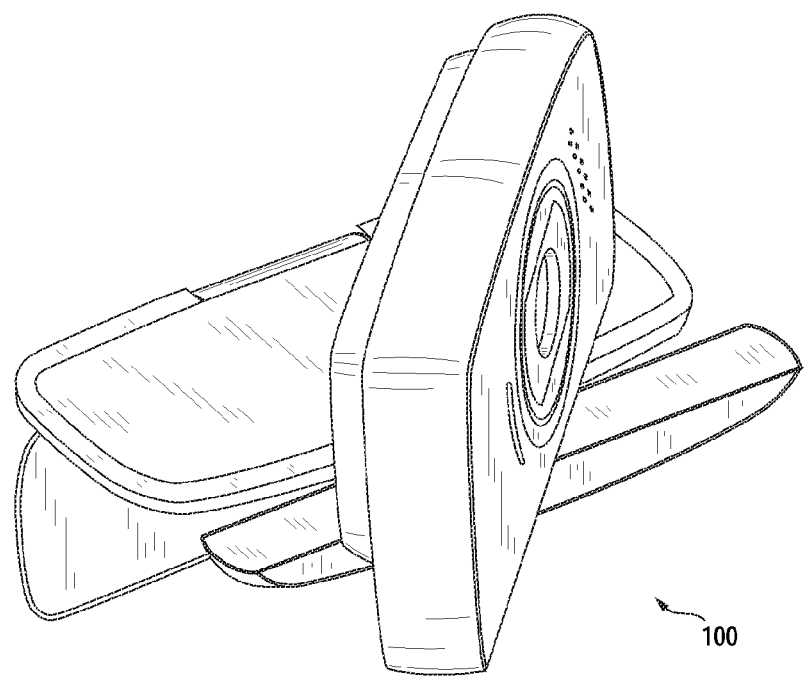
FIGS. 2B and 2C show the camera housing rotated right and left, respectively, with respect to the camera-housing base.
Figure 2C:
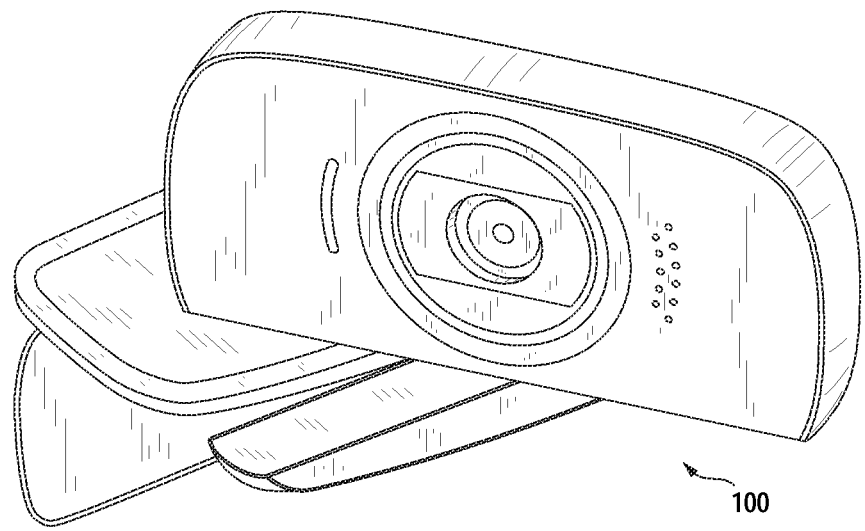

According to one embodiment, friction hinge 160 is configured such that camera housing 105 is configured to rotate at least 180° with respect to camera-housing base 110. According to another embodiment, friction hinge 160 is configured such that camera housing 105 is configured to rotate up to 360° with respect to camera-housing base 110. According to another embodiment, friction hinge 160 is configured such that camera housing 105 is configured to rotate more than 360° with respect to the camera-housing base 110. FIGS. 2B and 2C show the camera housing rotated right and left, respectively, with respect to the camera-housing base.

According to one embodiment, camera-housing base 110 is rotationally coupled to mounting base 115 by a hinge 170. More specifically, camera-housing base 110 is rotationally coupled to top wall 120 of mounting base 115 by hinge 170. Hinge 170 is configured to allow camera-housing base 110 to tilt (e.g., tilt up and tilt down) with respect to mounting base 115. For example, with mounting base 115 holding webcam 100 on a computer monitor, camera housing 105 and camera-housing base 110 may be tilted up or tilted down to change the field of view of the webcam. According to a further embodiment, hinge 170 is configured to permit front 105a of camera housing 110 to be folded substantially parallel and flush onto a top surface 120a of top wall 120.

Figure 3:
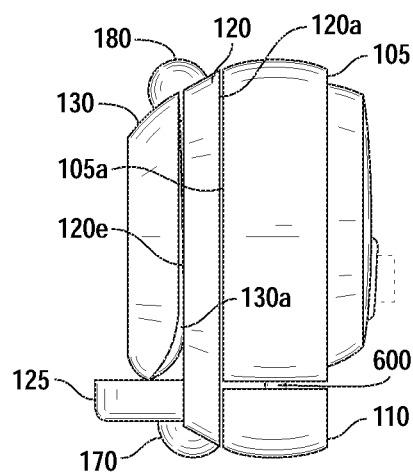
FIG. 3 is a side view of the webcam showing the front of the camera housing folded substantially flush onto the top surface of the top wall.

FIG. 3 is a side view of webcam 100 showing front 105a folded substantially flush onto top surface 120a of top wall 120. With mounting base 115, and more specifically top wall 120, covering front 105a of camera housing 105, the mounting base, and more specifically the top wall, serves as a lens cover for the camera housing. The particular configuration of the webcam as shown in FIG. 3 is discussed in further detail below with respect to a transport configuration of the webcam.

Figure 4:
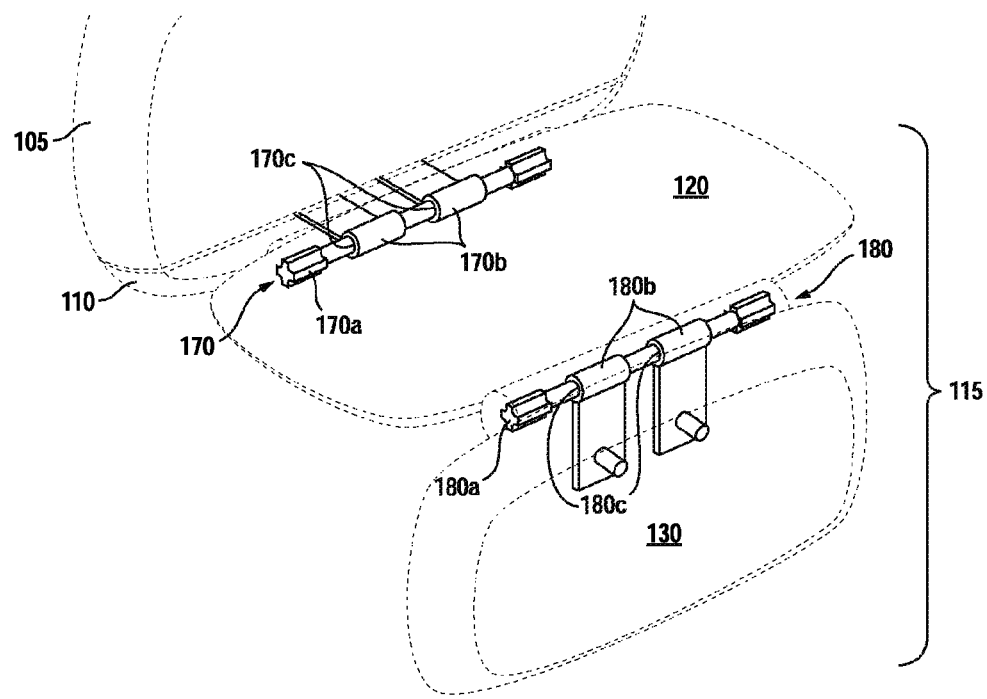
FIG. 4 is a back-perspective view of the webcam with the mounting base unfolded from the camera housing, and with the back wall unfolded from the top wall.

FIG. 4 is a back-perspective view of webcam 100 with the mounting base 115 unfolded from camera housing 105, and with back wall 130 unfolded from top wall 120. FIG. 4 shows various parts of the webcam as "see through" to further show interior details of the webcam, such as hinge 170. According to one embodiment, hinge 170 includes a rod 170a and a set of rod clamps 170b. Rod 170a passes through an opening 170c formed in each rod clamp. Rod 170a is in friction contact with rod clamps 170b such that camera housing 105 and camera-housing base 110 are configured to stay at a substantially fixed position (e.g., for typical use of the webcam) with respect mounting base 115 after these elements are manipulated by a user to put these elements in a configuration desired by the user. For example, the webcam as shown in FIG. 4 may be configured to be positioned on a top portion of the monitor of a laptop computer, on the top of a desktop monitor of a desktop computer, on the top portion of a flat screen TV, or the like. With the webcam positioned as shown in FIG. 4 (or otherwise positioned) the friction between rod 170a and the set of rod clamps 170b is sufficient such that camera housing and camera-housing base will not rotate with respect to the mounting case with the webcam mounted on a computer monitor or the like.

Figure 5:
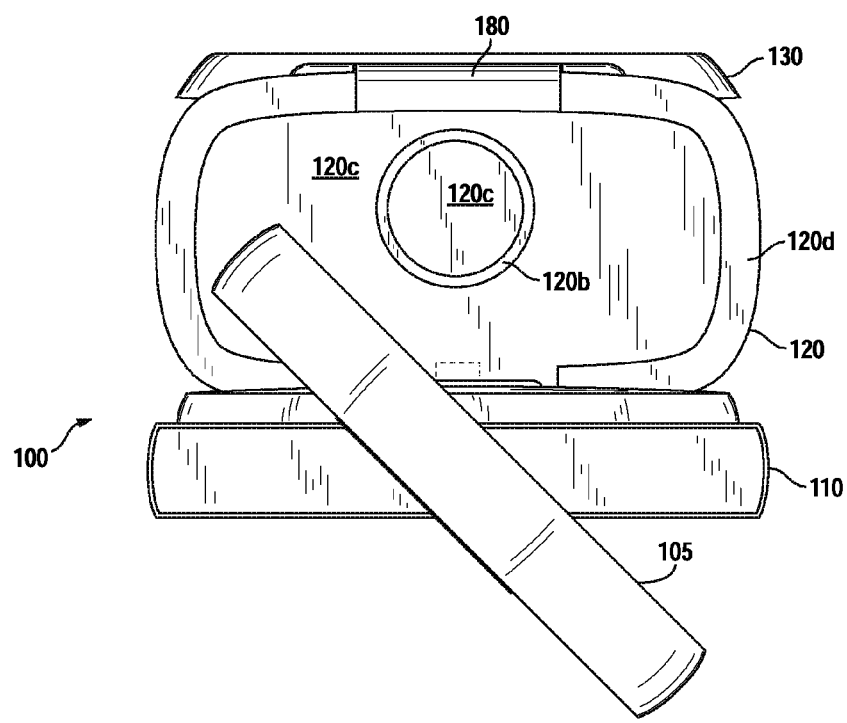
FIG. 5 is a simplified top view of the webcam.
Figure 6:
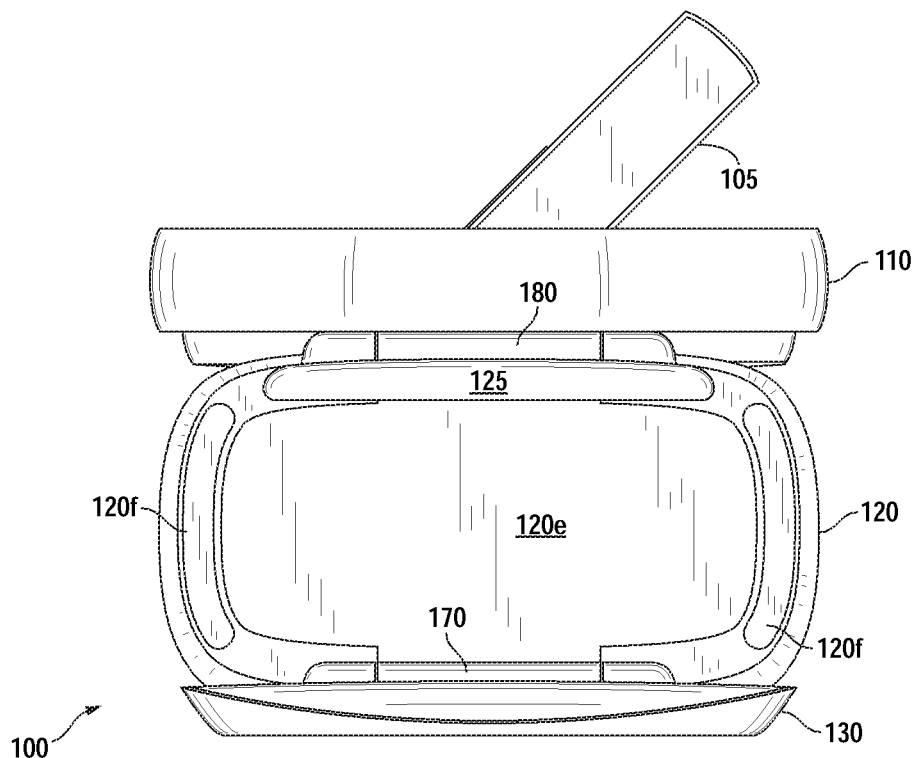
FIG. 6 is a simplified bottom view of the webcam.

FIG. 5 is a simplified top view of webcam 100, and FIG. 6 is a simplified bottom view of the webcam. According to one embodiment, the top surface 120a of top wall 120 includes a ring structure 120b, which may be raised with respect to surrounding surface 120c of the top surface. The raised circular portion (tapered portion) of ring structure 120b corresponds to camera opening 105b with the top wall folded flush onto the camera housing. The ring structure couples relatively closely to the camera opening to substantially seal the camera opening to prevent dust from settling on the camera opening during transport or storage of the webcam and prevents the lens from becoming damaged. According to one embodiment, an outer portion 120d of top surface 120a is formed of relatively hard plastic, whereas inner portion 120c of top surface 120a may be formed of a relatively softer plastic.

Referring to FIGS. 1A, 3 and 4, webcam 100 further includes a hinge 180, which rotationally couples top wall 120 to back wall 130, according to one embodiment of the present invention. Hinge 180 is configured to permit back wall 130 to be tilted (e.g., tilted up or tilted down) at a number of angles with respect to top wall 120. Various angles between back wall 130 and top wall 120 permit the webcam to be coupled to computer monitors having a variety of shapes. For example, back wall 130 may be set at a variety of angle via hinge 180 so that the webcam may be mounted on a relatively thin laptop computer monitor, a desktop monitor, a television, a set-top-box, etc. Further, hinge 180 is configured to permit back wall 130 to be folded into a position substantially parallel and flush with top wall 120 were an inside surface 130a of back wall 130 and a bottom surface 120e of top wall 120 are substantially parallel and flush with respect to one another. Bottom surface 120e may include a pair of rubberized inserts 120f, which provide cushioning between inside surface 130a and bottom surface 120e with these two surfaces folded substantially parallel and flush against one another. FIG. 3 shows the back wall folded substantially parallel and flush to top wall 120. Via first hinge 170 and second hinge 180, the webcam may be set up in a variety of configurations with the camera housing having a variety of fields of view. These hinges also allow for the webcam to be folded into a fairly compact unit for transport and the like, e.g., as is shown in FIG. 3. In this transport configuration, the webcam is relatively compact providing for ease of transport by a user. For example, the webcam in the transport configuration may be relatively easily placed in a bag, pocket, or the like for transport. Further, in the transport configuration, the various elements composing the webcam are "folded in" inhibiting damage to the various elements of the webcam, such as by "catching" on another objects and braking Hinge 180 also permits the back wall to be folded substantially parallel and flush to the top wall, while the camera housing is extended as shown in FIG. 1A.

Referring to FIG. 4, hinge 180 includes a rod 180a and a set of rod clamps 180b. Rod 180a and the set of rod clamps 180b are similarly configured to rod 170a and the set of rod clams 170b descried above. Specifically, rod 180a passes through an opening 180c formed in each rod clamp. Rod 180a is in friction contact with the set of rod clamps 180b such that top wall 120 and back wall 130 are configured to stay at a substantially fixed position with respect to each other after these elements are manipulated by a user to put these elements in a configuration desired by the user. For example, with the webcam on a computer monitor, rod 180*a* and the set of rod clamps 180*b* are configured to stay in a relatively fixed position to maintain the angular orientation of the top wall and the back wall.

Figure 7:
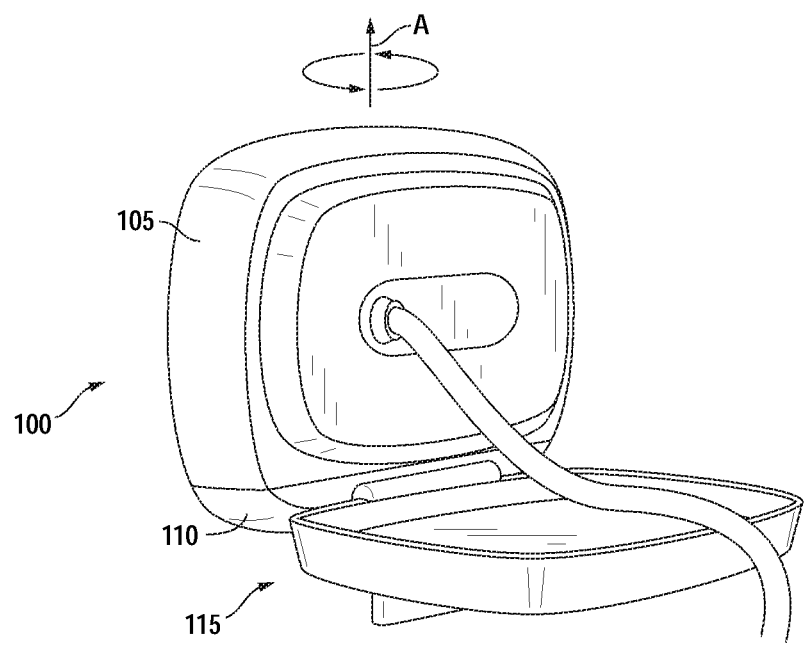
FIG. 7 shows the webcam with the back wall folded substantially parallel and flush to the top wall, and the camera housing is extended at a non-zero angle (e.g., about 90 degrees) with respect to the mounting base.

FIG. 7 shows webcam 100 with the back wall folded substantially parallel and flush to the top wall, and the camera housing being extended at a non-zero angle (e.g., about 90 degrees) with respect to the mounting base. In the particular configuration of the webcam shown in FIG. 6, the mounting base is configured to be placed on a surface (e.g., a flat desktop) so that the webcam may be used as a desktop webcam.

According to one embodiment one or both of hinges 170 and 180 may be motorized hinges. According to another embodiment, friction hinge 160 is also motorized. A motorized hinge and a motorized friction hinge provides for the rotation of the elements, which are coupled by the motorized hinge or the motorized friction hinge. For example, a motorized hinge 170 provides for the motorized tilt of the camera housing and the camera-housing base relative to mounting base 115. According to a further example, motorized friction hinge 160 provides for the motorized panning of the camera housing relative to the camera-housing base. Motors in the motorize hinges and/or the motorized friction hinge may be electronically coupled to the processor, which is configured to control the motorized hinges and/or the motorized friction hinge.

According to one embodiment, the microphone and the processor are configured to operate to track the movement of an audible signal that the microphone detects. For example, the microphone might detect a person talking into the microphone during a video telephone call. If the person moves while talking, the processor in combination with the microphone may be configured to track the person's voice and the processor may be configured to operate one or both of the motorized hinges and/or the motorized friction hinge to rotate the camera housing to point the light collection array at the location from which the audible signal originates. According to one embodiment, the webcam includes a plurality of microphones to provide for relatively accurate tracking of an audio signal. According to an alternative embodiment, the processor may be configured to operate with the light collection array to track the movement of a light source (e.g., a person) as the light source moves relative to the light collection array. The processor may be configured to track this movement of the light source and to operate one or both of the motorized hinges and/or the motorized friction hinge to rotate the camera housing to point the light collection array at the location of the light source as the light source moves.

It is to be understood that the examples and embodiments described above are for illustrative purposes only and that various modifications or changes in light thereof will be suggested to persons skilled in the art, and are to be included within the spirit and purview of this application and scope of the appended claims. Therefore, the above description should not be understood as limiting the scope of the invention as defined by the claims.

What is claimed is:

1. An image capturing device comprising:
a camera housing configured to house a set of electronic modules for capturing light from a scene and generating an image from the captured light, wherein the camera housing includes a camera opening configured to let light enter the camera housing to be captured by the set of electronic modules;
a camera-housing base rotationally coupled to the camera housing;
a mounting base rotationally coupled to the camera-housing base, wherein the camera housing is configured to rotate with respect to the camera-housing base to face the camera opening toward the mounting base or face the camera housing opening away from the mounting base; and
a first hinge rotationally coupling the mounting base to the camera-housing base,
wherein the mounting base includes a top wall, a front wall, and a back wall, which are configured to couple to mounting base to computer monitor or sit on a work surface to hold the camera housing for collecting light from a scene; and
wherein the mounting base includes a second hinge rotationally coupling the top wall and the back wall.

2. The image capturing device of claim 1, wherein the back wall is rotatable on the second hinge to align the back wall substantially parallel and flush with the top wall.

3. The image capturing device of claim 2, wherein the top wall includes a raised portion that correspond to the location of the camera opening with the back wall substantially parallel and flush with the top wall to prevent dust from contacting the camera opening.

4. The image capturing device of claim 3, wherein the raised portion is round.

5. The image capturing device of claim 3, wherein the raised portion is circular.

6. The image capturing device of claim 1, further comprising a friction hinge rotationally coupling the camera housing and the camera-housing base, wherein via the friction hinge the camera housing is configured to pan with respect to the camera-housing base.

7. The image capturing device of claim 1, further comprising the set of electronic modules, which includes a light meter and a light collection array, and the light collection array is configured to adjust a light capture setting based on a light collection signal generated by the light meter.

8. The image capturing device of claim 1, wherein the set of electronic modules is configured to generate a series of images for a video stream from the capturing light.

9. The image capturing device comprising:
a camera housing configured to house a set of electronic modules for capturing light from a scene and generating an image from the captured light, wherein the camera housing includes a camera opening configured to let light enter the camera housing to be captured by the set of electronic modules;
a camera-housing base rotationally coupled to the camera housing;
a mounting base rotationally coupled to the camera-housing base, wherein the camera housing is configured to rotate with respect to the camera-housing base to face the camera opening toward the mounting base or face the camera housing opening away from the mounting base; and
a first hinge rotationally coupling the mounting base to the camera-housing base,
wherein the first hinge is motorized hinge.

10. The image capturing device of claim 9, further includes a processor coupled to the motorized hinge and configured to control the motorized hinge.

11. The image capturing device of claim 10, further includes a microphone couple to the processor configured to operate with the processor to determine a direction of sound on the camera housing, wherein the processor is configured to control the motorized hinge to direct the camera housing at the sound.

12. The image capturing device of claim 11, further comprising a motorized friction hinge rotationally coupling the camera housing and the camera-housing base.

13. The image capturing device of claim 12, wherein the processor is configured to control the motorized friction hinge to pan the camera housing at the sound.

14. A method of manufacturing an image capturing device comprising:
providing a camera housing configured to house a set of electronic modules for capturing light from a scene and generating an image from the captured light, wherein the camera housing includes a camera opening configured to let light enter the camera housing to be captured by the set of electronic modules;
providing a camera-housing base rotationally coupled to the camera housing;
providing a mounting base rotationally coupled to the camera-housing base, wherein the camera housing is configured to rotate with respect to the camera-housing base to face the camera opening toward the mounting base or face the camera housing opening away from the mounting base; and
providing a first hinge rotationally coupling the mounting base to the camera-housing base,
wherein with the camera opening facing toward the mounting base, the first hinge is configured such that the mounting base is foldable onto the camera opening to cover the camera opening,
wherein the mounting base includes a top wall, a front wall, and a back wall, which are configured to couple the mounting base to computer monitor or sit on a work surface to hold the camera housing for collecting light from a scene; and
wherein the mounting base includes a second hinge rotationally coupling the top wall and the back wall.

15. The method of claim 14, wherein the back wall is rotatable on the second hinge to align the back wall substantially parallel and flush with the top wall.

16. The method of claim 15, wherein the top wall includes a raised portion that corresponds to the location of the camera opening with the back wall substantially parallel and flush with the top wall to prevent dust from contacting the camera opening.

17. The method of claim 16, wherein the raised portion is at least one of round or circular.

18. The method of claim 14, further comprising providing a friction hinge rotationally coupled the camera housing and the camera-housing base, wherein via the friction hinge the camera housing is configured to pan with respect to the camera-housing base.

* * * * *